United States Patent [19]
Geller

[11] 3,882,437
[45] May 6, 1975

[54] HARMONIC CANCELLATION IN A VARIABLE COUPLING TRANSFORMER

[75] Inventor: Robert Z. Geller, Mount Kisco, N.Y.

[73] Assignee: Inductosyn Corporation, Valhalla, N.Y.

[22] Filed: July 13, 1973

[21] Appl. No.: 379,142

[52] U.S. Cl. .............................. 336/123; 336/129
[51] Int. Cl. .......................................... H01f 21/04
[58] Field of Search ............ 336/122, 123, 115, 129

[56] References Cited
UNITED STATES PATENTS

| | | | |
|---|---|---|---|
| 2,799,835 | 7/1957 | Tripp et al. | 336/123 |
| 2,867,783 | 1/1959 | Childs | 336/123 |
| 2,900,612 | 8/1959 | Tripp | 336/123 |
| 3,772,587 | 11/1973 | Ferrand | 336/123 |

Primary Examiner—Thomas J. Kozma
Attorney, Agent, or Firm—William E. Beatty; John L. Downing

[57] ABSTRACT

A transformer has a secondary winding which is movable relative to a pair of primary windings. When a carrier voltage is applied to the primary windings, the secondary winding provides a voltage which varies as a function of the relative position of the windings. The secondary voltage includes a spatial fundamental component and a multiplicity of undesired spatial harmonic components. The secondary voltage does not include the spatial third harmonic component because a displacement equal to one-half cycle thereof is provided between the primary windings. Alternatively, when the carrier voltage is applied to the secondary winding, the primary windings provide a voltage which varies as a function of the relative position. Although the primary voltage includes the spatial fundamental component and the undesired harmonic components, the third spatial harmonic component is not included because of the half-cycle displacement.

10 Claims, 5 Drawing Figures

HARMONIC CANCELLATION IN A VARIABLE COUPLING TRANSFORMER

BACKGROUND OF THE INVENTION

1. Field of the Invention

This invention relates to apparatus for providing signals representative of a displacement between two relatively movable structures and more particularly to apparatus for cancelling an undesired spatial harmonic component of a voltage provided by a variable coupling transformer.

2. Description of the Prior Art

An example of a rotary variable coupling transformer is a resolver having a pair of secondary windings which are rotatable relative to a primary winding. When the primary winding is connected to an AC carrier voltage source, the secondary windings provide secondary voltages which respectively include sine and cosine voltages. The sine and the cosine voltages are respectively representative of the sine and the cosine of an angular location of the secondary windings with respect to the primary winding.

In representing the sine of the angular location, the amplitude of the sine voltage is proportional to the amplitude of the sine of the angular location. The phase of the sine voltage, relative to the carrier phase, is representative of the sign of the sine of the angular location. The cosine of the angular location is represented in a similar manner.

The secondary voltages additionally include a multiplicity of undesired spatial harmonic components of different orders which obscure a determination of the value of the sine and the cosine voltages. Typically, the amplitude of a spatial harmonic component is proportional to the amplitude of the sine (or the cosine) of a corresponding harmonic multiple of the angular location. Similar to the sine and the cosine voltages, the phase of the spatial harmonic component is representative of the sign of the sine (or the cosine) of the harmonic multiple of the angular location. Three cycles of the spatial third harmonic component, for example, exist during one revolution of the secondary windings relative to the primary winding.

Because the secondary voltages include a multiplicity of spatial harmonic components, it is desirable to provide for the cancellation of as many as possible, thereby facilitating the determination of the sine and the cosine voltages.

In Tripp's U.S. Pat. No. 2,900,612, a rotary variable coupling transformer is disclosed where a primary winding is comprised of a plurality of conductors respectively arranged to define spirals of equal and constant pitch. Secondary windings of the transformer are comprised of arcuate active conductors which may be disposed circumferentially, have a selected circumferential extent and have a selected conductor width to cause a cancellation of spatial harmonic components.

In Tripp's U.S. Pat. 2,799,835, transformers are disclosed where the spacing between active conductors of a winding is selected to cause a cancellation of a spatial harmonic component.

SUMMARY OF THE INVENTION

An object of the present invention is to provide an electrical signal which is representative of the location of one structure relative to another, where the structures are relatively movable.

Another object of the present invention is to provide an electrical signal which is representative of the angular location of one structure relative to another, where the structures are relatively rotatable.

Another object of the present invention is to cancel a spatial harmonic component of a voltage provided by a winding of a variable coupling transformer.

According to the present invention, a variable coupling transformer has a secondary winding mounted for rotation relative to first and second concentric primary windings; said primary windings include a conductor disposed to define a pair of series connected spirals of equal and constant pitch having a known angular displacement from each other, said primary windings having an angular displacement therebetween which is equal to an odd multiple of one-half cycle of a known undesired spatial harmonic component of a voltage provided by said secondary winding as a function of the angular location thereof with respect to said primary windings when a carrier voltage is applied thereto which causes a current to flow clockwise and counterclockwise, respectively, through corresponding spirals of said primary windings.

In further accord with the present invention, at a large radial displacement from a central point a portion of said spiral conductors are defined as being substantially straight segments; segments of said primary windings are respectively connected in series whereby said primary windings have a displacement therebetween which is equal to said odd multiple of one-half cycle of said known spatial harmonic component.

A rotary variable coupling transformer constructed according to the invention has a pair of primary windings, each of which is arranged to define a pair of spirals having an angular displacement from each other of 180 degrees. The primary windings have a selected angular displacement therebetween for the cancellation of a spacial harmonic component of an induced voltage.

A linear variable coupling transformer constructed according to the invention has a pair of primary windings comprised of segments equivalent to portions of concentric spirals at a large radial displacement from the center thereof. The portions are arranged for the cancellation of a spacial harmonic component of an induced voltage.

The present invention provides for the cancellation of one unwanted spatial harmonic component in a manner heretofore unknown in the prior art. Other unwanted spatial harmonic components may be cancelled by techniques known in the prior art referred to hereinbefore.

Other objects, features and advantages of the present invention will become more apparent in the light of the following detailed description of a preferred embodiment thereof as illustrated in the accompanying drawing.

DESCRIPTION OF THE PREFERRED EMBODIMENT

In order to explain the teachings of the present invention, a description of an exemplary embodiment thereof is provided for tutorial purposes. Additionally, a description of a resolver and a description of a linear coupling transformer are provided.

In the exemplary embodiment, a secondary winding is rotatable relative to a pair of primary windings having a selected angular displacement therebetween. During 360° of relative rotation, the primary windings each induce a spatial fundamental component and undesired harmonic components of a secondary voltage into the secondary winding. When the selected angular displacement is equal to one-half cycle of a known undesired spatial harmonic component, the primary windings respectively induce two portions of the known spatial harmonic component which are out of phase with each other thereby cancelling the known spatial harmonic component. Accordingly, the known spatial harmonic component is not included in the secondary voltage.

In the embodiments described hereinafter, the terms secondary winding and primary winding are used only to distinguish the windings. A secondary winding, for example, may be connected to a voltage source whereby a voltage is induced into a primary winding.

Figure 1:
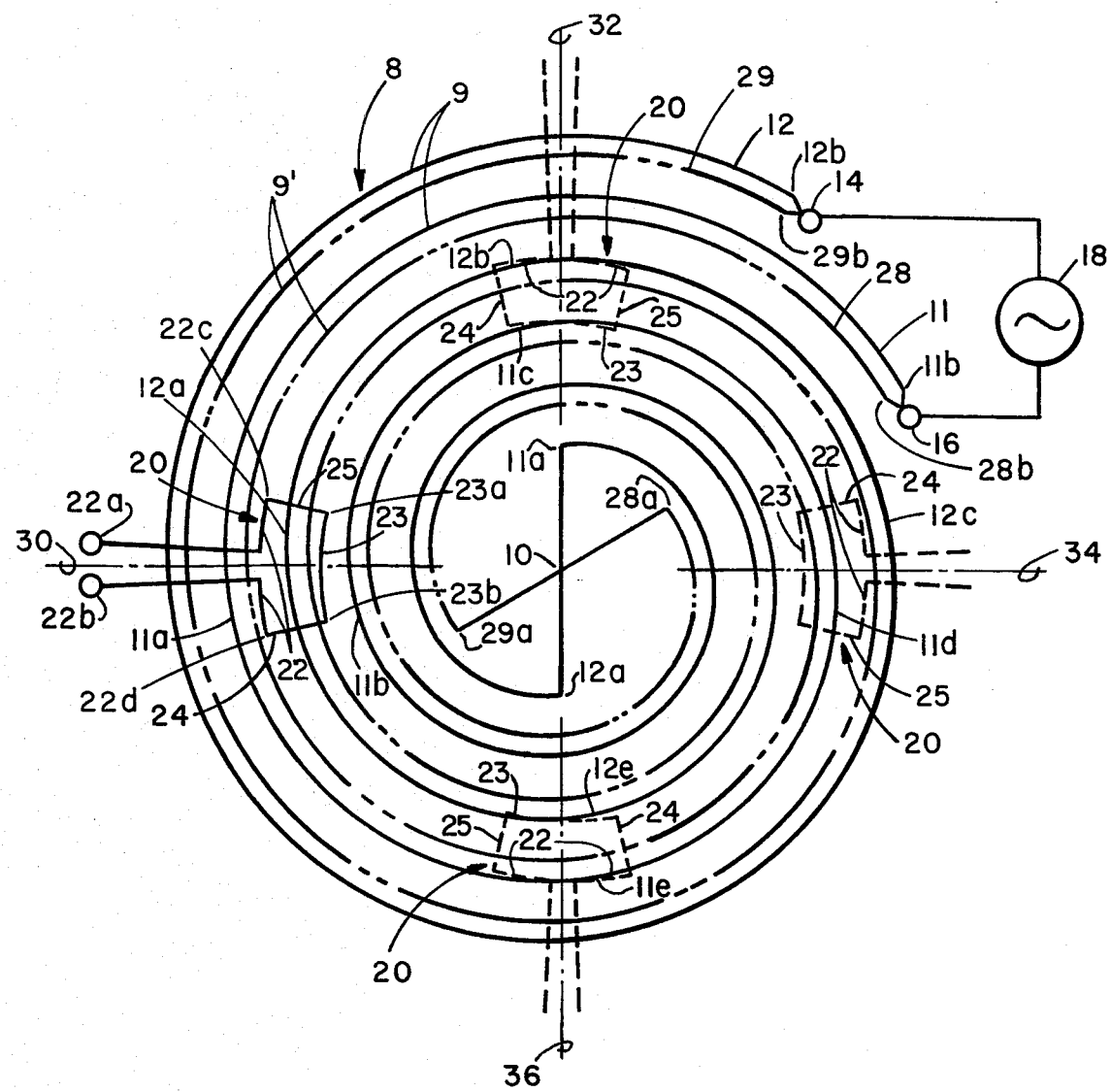
FIG. 1 is a schematic plan view of the windings used in an exemplary embodiment where the secondary winding (shown in full lines) at one angular location is successively rotated to three other angular locations (where the secondary winding is shown in broken lines)

Referring now to FIG. 1, windings of a rotary variable coupling transformer 8 include a first primary winding 9 and a second primary winding 9' which are similar to each other. The windings 9, 9' are substantially within a plane wich is referred to hereinafter as a primary plane.

The first primary winding 9 is comprised of spiral conductors 11, 12 which define spirals about a central axis 10. The defined spirals are of equal and constant pitch and have an angular displacement of 180° from each other.

As explained hereinafter, when the 180° displacement is provided and the spirals 11, 12 conduct currents in opposite directions, a magnetic field is established which induces a secondary voltage into a secondary winding of the transformer 8. The secondary voltage is a function of the radial proximity of the secondary winding to the spirals 11, 12. It should be understood that the change of the radial proximity is equal to the pitch when the secondary winding is rotated 180° relative to the primary winding. In response to 180° of relative rotation, 180° of the spatial fundamental component of the secondary voltage is induced into the secondary winding.

An inner end 11a of the spiral 11 and an inner end 12a of the spiral 12 are connected together and an outer end 11b of the spiral 11 and an outer end 12b of the spiral 12 are respectively connected to terminals 14, 16.

An AC carrier voltage is applied to the first primary winding 9 by a carrier voltage source 18 having outputs respectively connected to the terminals 14, 16. Therefore, the spirals 11, 12 comprise a series circuit where a current flowing clockwise through the spiral 11 equals a current flowing counter-clockwise through the winding 12 and vice versa.

The transformer 8 further includes a secondary winding 20 which is rotatable about the axis 10 relative to the first primary winding 9. The winding 20 has a split active conductor 22, an active conductor 23 and inactive conductors 24, 25 substantially within a secondary plane parallel to the primary plane. The conductor 22 is split in the central portion thereof to provide for the connection thereto of terminalas 22a, 22b where the secondary voltage is provided.

The conductors 22, 23 are concentrically arcuate about the axis 10 with a radial displacement therebetween equal to one-half of the pitch of the spirals 11, 12. Ends 22c, 22d of the conductor 22 are respectively connected to ends 23a, 23b of the conductors 23 by the conductors 24, 25 whereby the conductors 22–25 are connected in series.

The conductors 24, 25 are arranged substantially at right angles to the conductors 22, 23, the arrangement being radial from the axis 10.

It should be understood that in response to the source 18 causing a current to flow through the first primary winding 9, a first magnetic field is established. The first field magnetically couples the conductors 22, 23 to the first primary winding 9 because of the parallel arrangement referred to hereinbefore. Analogously, there is substantially no coupling between the first primary winding 9 and the conductors 24, 25 because of their radial arrangement.

As known to those skilled in the art, when the winding 20 is magnetically coupled to one of the spirals 11, 12, a flow of current through the coupled spiral establishes a portion of the first field that cause the conductors 22, 23 to have opposing voltages respectively induced therein. The difference of the opposing voltages is provided by the winding 20. However, when conductors 22, 23 are magnetically coupled to the spirals 11, 12, respectively, (and vice versa) the currents therethrough establish portions of the first field that cause the conductors 22, 23 to have aiding voltages induced therein. The sum of the aiding voltages is provided by the winding 20. Therefore, a voltage provided by the winding 20 is in accordance with the coupling provided by the first field.

As explained more fully hereinafter, the first field induces a first voltage into the winding 20 as a function of an angular location thereof with respect to the first primary winding 9. The first voltage has a spatial fundamental component with an amplitude and a phase which define one cycle of a sinusoid during a 360° change of the angular location. Additionally, the first voltage is comprised of undesired spatial harmonic components.

In this embodiment, the second primary winding 9' is comprised of a second pair of spiral conductors 28, 29 (shown as broken lines) which define spirals concentric with the spirals 11, 12. The spirals 28, 29 have the constant pitch and an angular displacement of 180° from each other and have respective clockwise angular displacements of 60° from the spirals 11, 12.

Because of the angular displacements between the spirals 11, 12, 28, 29 described hereinbefore, the respective radial displacements between the spirals 11, 12 and the spirals 29, 28 equals five-sixths of the pitch; the respective radial displacements between the spirals 11, 12 and the spirals 28, 29 equals one-sixth of the pitch. It should be understood that the 60 degrees corresponds to the one-half cycle of the spatial third harmonic component of the secondary voltage.

Similar to the spirals 11, 12, an inner end 28a of the spiral 28, and an inner end 29a of the spiral 29, are connected together, an outer end 28b of the spiral 28 and an outer end 29b of the spiral 29 being respectively connected to the terminals 14, 16 whereby the primary windings 9, 9' are connected in parallel.

AS explained hereinafter, because the primary windings 9, 9' have an angular displacement therebetween which is equal to one-half cycle of the spatial third harmonic of the secondary voltage, the primary windings 9, 9' respectively induce into the winding 20 two portions of a spatial third harmonic component which are out of phase with each other. Because the portions of the spatial third harmonic components are induced out of phase, they cancel each other whereby the spatial third harmonic component is not included in the secondary voltage. In alternative embodiments, the angular displacement may be other than 60° to cause the cancellation of some other spatial harmonic component.

The source 18 causes a current to flow through the second primary winding 9' thereby establishing a second magnetic field. The second magnetic field couples the conductors 22, 23 to the second primary winding 9' whereby a second voltage is induced into the winding 20.

According to the well known principle of superposition, the secondary voltage is the sum of the first and second voltages. The principle of superposition is applied hereinafter to show that a spatial third harmonic component is not included in the secondary voltage.

When the winding 20 has an angular location causing a symmetric disposition thereof about a radius 30, the conductors 22, 23 are both equidistant from a portion 12a of the spiral 12 and respectively equidistant from portions 11a, 11b of the spiral 11. Accordingly, the portions 11a, 11b, 12a are the portions of the first primary winding 9 in closest proximity to the conductors 22, 23. Because of the proximity, parts of the first magnetic field which couple the winding 20 to the first primary winding 9 are established in response to the currents in the portions 11a, 11b, 12a.

It should be understood that the currents in the portions 11a, 11b have the same amplitude and concurrently flow in either a clockwise or a counter-clockwise direction. Accordingly, when the winding 20 is symmetrically disposed about the radius 30, the current through the spiral 11 establishes a part of the first magnetic field which induces opposing voltages into the conductors 22, 23.

Since the conductors 22, 23 are equidistant from the portion 12a, the current through the spiral 12 establishes an additional part of the first magnetic field which induces opposing voltages into the conductors 22, 23. Hence, when the winding 20 is disposed symmetrically about the radius 30, the first voltage is substantially zero.

As the winding 20 is rotated clockwise, the angular location changes to cause a symmetric disposition of the winding 20 about a radius 32. With the symmetric disposition about the radius 32, the conductor 23 is in close proximity to a portion 11c of the spiral 11 and the conductor 22 is in close proximity to a portion 12b of the spiral 12. Because of the proximity, parts of the first magnetic field which couple the winding 20 to the first primary winding 9 are established in response to the currents in the portions 11c, 12b.

Because the currents through the portions 11c, 12b are in opposite directions, the currents through the spirals 11, 12 establish a part of the first magnetic field which induces respectively aiding voltages into the conductors 22, 23. Hence, when the winding 20 is disposed symmetrically about the radius 32, the first voltage is a maximum.

Further clockwise rotation of the winding 20 changes the angular location to cause a symmetric disposition of the winding 20 about a radius 34. With the symmetric disposition about the radius 34, the conductors 22, 23 are equidistant from a portion 11d of the spiral 11 and respectively equidistant from portions 12c, 12d of the spiral 12.

For reasons analogous to those given in connection with the symmetric disposition about the radius 30, when the winding 20 has a symmetric disposition about the radius 34, the first voltage is substantially zero.

Further clockwise rotation of the winding 20 changes the angular location to cause a symmetric disposition of the winding 20 about a radius 36. When the symmetric disposition is about the radius 36, the conductor 22 is in close proximity to a portion 11e of the spiral 11 and the conductor 23 is in close proximity to a portion 12e of the spiral 12.

For reasons analogous to those given in connection with the symmetric disposition about the radius 32, when the winding 20 has a symmetric disposition about the radius 36, the first voltage is a maximum.

Further rotation of the winding 20 causes the symmetric disposition thereof about the radius 30 which is described hereinbefore.

Because the currents are provided by the source 18 through the spirals 11, 12 in opposite directions, the first voltage has a known phase (referred to as a positive phase hereinafter) with respect to the phase of the carrier voltage for aangular locations of the winding 20 intermediate to the symmetric dispositions about the radii 30, 32, 34. Correspondingly, the first voltage has a phase opposite from the known phase (referred to as a negative phase hereinafter) for angular locations of the winding 20 intermediate to the symmetric dispositions about the radii 34, 36, 30.

Figure 2:
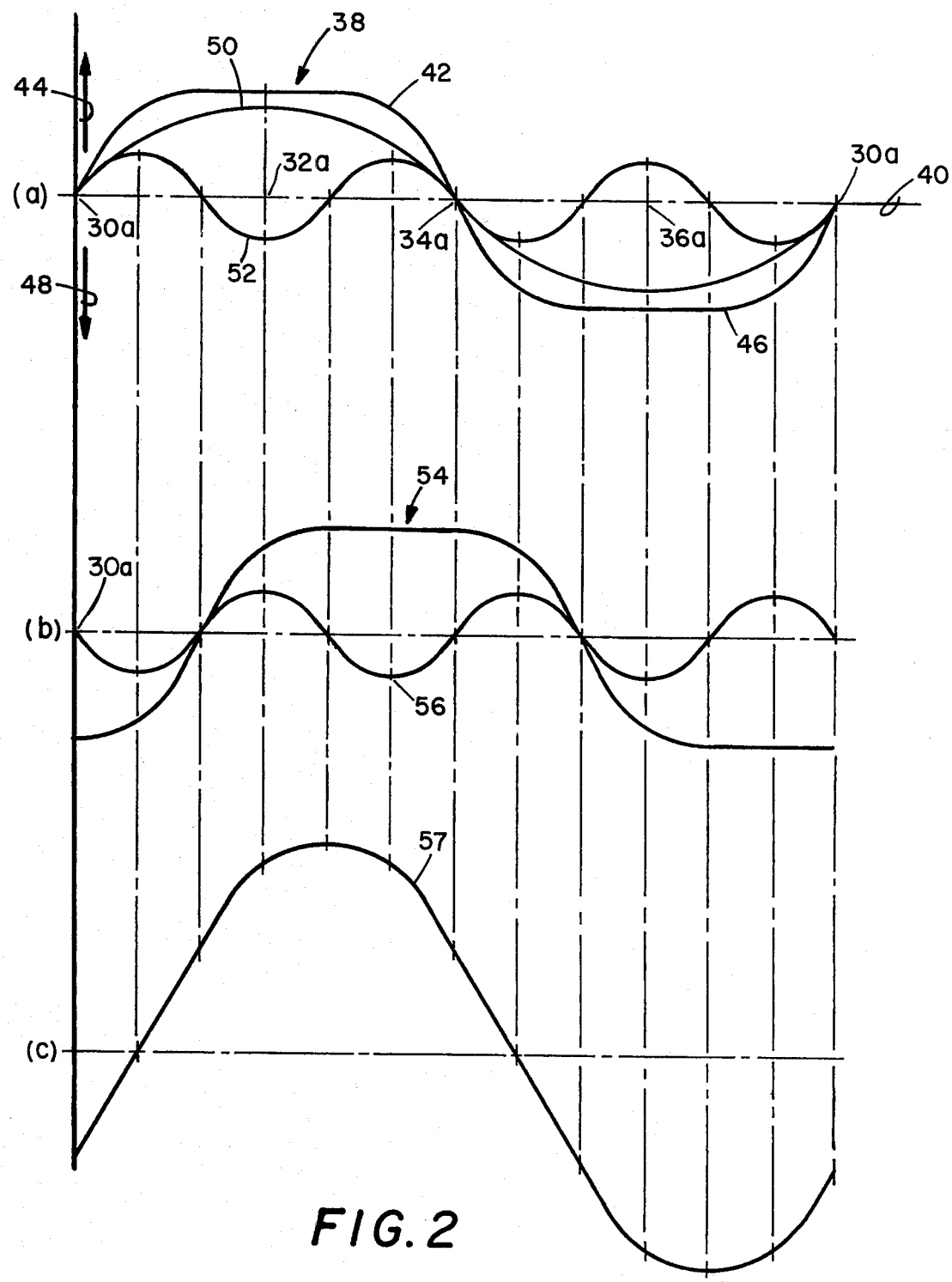
FIG. 2 is a representation of voltages provided in the embodiment of FIG. 1.

Referring now to FIG. 2, illustration (a) includes a waveform 38 which is representative of the first voltage as a function of the angular location of the winding 20. Additionally, an abscissa 40 intersects points 30a, 32a, 34a, 36a, which are respectively representative of the angular locations of the radii 30, 32, 34, 36 (FIG. 1).

A portion 42 of the waveform 38 has a displacement from the abscissa 40 (referred to as an ordinate displacement) which is representative of the first voltage which is provided for angular locations of the winding 20 intermediate to the symmetric dispositions about the radii 30, 32, 34. The ordinate displacement being in a direction of an arrow 44 provides an indication that phase of the first voltage is positive.

Correspondingly, a portion 46 of the waveform 38 has an ordinate displacement representative of the first voltage which is provided for angular locations of the winding 20 intermediate to the symmetrical dispositions about the radii 34, 36, 30. The ordinate displacement being in a direction of an arrow 48 provides an indication that the phase of the first voltage is negative.

From the waveform 38 it should be appreciated that the first voltage is not sinusoidal. However, as is known to those skilled in the art, the first voltage is the sum of a spatial fundamental component having a sinusoidal waveform and a multiplicity of spatial harmonic components having respective sinusoidal waveforms.

Waveforms 50, 52 are respectively representative of the spatial fundamental and third harmonic components of the first voltage. As explained hereinafter, the second voltage has a spatial third harmonic component of the same magnitude but of an opposite phase from the spatial third harmonic of the first voltage. Because the secondary voltage is the sum of the first and second voltages, a spatial third harmonic component is not included in the secondary voltage.

Because of the 60° angular displacement between the primary windings 9, 9', the second voltage at a given angular location of the winding 20 equals the first voltage when the winding 20 has an angular location 60° counterclockwise from the given location. In other words, for a clockwise rotation of the winding 20, the second voltage lags the first voltage by 60°. Therefore, when the winding 20 is located 60° clockwise from the symmetric disposition about the radius 30 or the radius 34, the second voltage is substantially zero. Similarly, when the winding 20 is located 60 degrees clockwise from the symmetrical disposition about the radius 32 or the radius 36, the second voltage is a maximum.

In accordance with the explanation given hereinbefore, FIG. 2, illustration (b) includes a waveform 54 which is representative of the second voltage. The spatial third harmonic component of the second voltage is represented by a waveform 56. Because the displacement between the primary windings 9, 9' is equal to one-half cycle of the third spatial harmonic of the secondary voltage, the third spatial harmonic components of the first and second voltages are respectively out of phase. Accordingly, there is a cancellation whereby a spatial third harmonic component is not included in the secondary voltage.

FIG. 2, illustration (c) is of a waveform 57 having an ordinate displacement which is the sum of the ordinate displacements of the waveforms 38, 54. Therefore, the waveform 57 is representative of the secondary voltage provided at the terminals 22a, 22b. It is well known that a generally rectangular waveform (such as the waveforms 38, 54) includes only spatial harmonic components of an odd order. Additionally, the amplitude of a spatial harmonic component is inversely related to its order. Accordingly, the waveform 57 resembles a sinusoid because the spatial third harmonic component of the waveform 38 (and the waveform 54) has the largest amplitude of all of the undesired spatial harmonic components. Therefore, the secondary voltage includes higher than third order spatial harmonic components, many of which may be substantially cancelled by using the techniques in the prior art referred to hereinbefore.

Because the components of the secondary voltage are cyclically repetitive, the order of a cancelled spatial harmonic component and the displacement between the primary windings is in accordance with a relationship which is given as:

$$\theta = K \frac{360}{2n}$$

$\theta$ is the angular displacement in degrees between the primary windings;
$K$ is an odd integer; and
$n$ is the order of the cancelled spatial harmonic component.

From the explanation given hereinbefore, it should be appreciated that in the exemplary embodiment, K equals 1 and n equals 3.

It should be understood that a transformer is a bilateral device. Accordingly, in response to a carrier voltage being applied to the secondary winding 20, the primary windings provide a primary voltage representative of the angular location. Similar to the secondary voltage, the primary voltage does not include a spatial third harmonic component.

Figure 3:
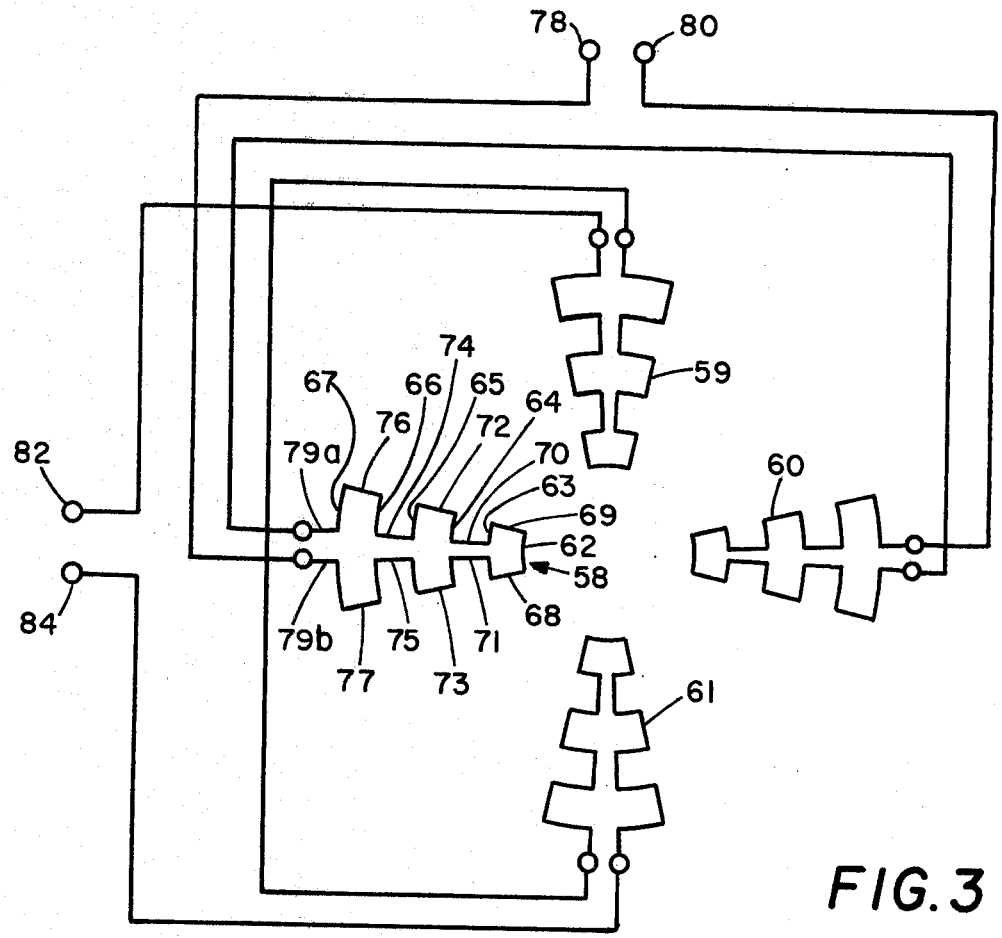
FIG. 3 is a plan view of the secondary windings of a resolver useful in cooperation with the primary winding of FIG. 1.

Referring now to FIG. 3, the windings of a resolver may be constructed by providing primary windings as described hereinbefore and by providing four similar secondary windings 58–61 within the secondary plane. The windings 58–61 are arranged about the axis 10 with a 90° displacement between adjacent windings. Accordingly, the windings 58, 60 are each in sapce quadrature with the windings 59–61.

Because of the space quadrature, the spatial fundamental component of a secondary voltage provided by the winding 58 (or the winding 60) is shifted 90° from the spatial fundamental component of the secondary voltage provided by the winding 59 (or the winding 61).

The winding 58 is comprised of active conductors 62–67 which are concentrically arcuate about the central axis with a radial displacement therebetween of one-half of the pitch of the spirals 11, 12, 28, 29 (FIG. 1). The arcuate extent of the conductors 62–67 is symmetric about a radius emanating from the axis 10.

As described hereinafter, the conductors 62–67 are connected in series whereby the winding 58 provides a secondary voltage in accordance with the coupling of the conductors 62–67 to the primary windings. Because of the symmetry and the displacement between the conductors 62–67 being one-half of the pitch, the conductors 62, 64, 66 all have similar proximities to the spirals 11, 12, 28, 29. Correspondingly, the conductors 63, 65, 67 all have similar proximities to the spirals 11, 12, 28, 29. Accordingly, the conductors 62, 64, 66 are collectively equivalent to the conductor 23 and the conductors 63, 65, 67 are collectively equivalent to the conductor 22 whereby the conductors 62–67 provide a secondary voltage in a manner similar to the conductors 22, 23 described hereinbefore.

The conductor 62 is connected at the ends thereof to the conductor 63 by a pair of radially disposed inactive conductors 68, 69 thereby providing a structure similar to the winding 20 described hereinbefore.

The conductors 63, 64 are split with the central portions thereof being connected by radially disposed inactive conductors 70, 71. The ends of the conductors 64, 65 are connected together by radially disposed inactive conductors 72, 73 whereby the conductors 64, 65 are connected in series with the conductors 62, 63.

The conductors 65, 66 are also split at the central portions thereof and connected together by radially disposed inactive conductors 74, 75. The ends of the conductors 66, 67 are connected together by radially inactive conductors 76, 77. Accordingly, the active conductors 62–67 are all connected in series. The conductor 67 is split at the central portion thereof and connected to inactive conductors 79a, 79b where the secondary voltage of the winding 58 is provided.

The series connection of the conductors 62–67 provides greater total active conductor lengths than are provided in the winding 20 described hereinbefore. Accordingly, the secondary voltage provided by the winding 58 is greater than the secondary voltage provided by the winding 20.

Because of the symmetric disposition of the windings 58–61, the windings 58, 60 and the windings 59, 61 each have an angular displacement therebetween of 180°. The windings 58, 60 are connected in series to sine terminals 78, 80 and the windings 59, 61 are connected in series to cosine terminals 82, 84. Because of the series connections, the sum of the secondary voltages provided by the windings 58, 60 (referred to as a first resolver output voltage hereinafter) and the sum of the secondary voltages provided by windings 59, 61 (referred to as a second resolver output voltage hereinafter) are respectively provided at the sine terminals 78, 80 and the cosine terminals 82, 84.

For a clockwise rotation of the windings 58–61 with respect to the primary windings, the first resolver output voltage has a spatial fundamental component which leads by 90 degrees a spatial fundamental component of the second resolver output voltage. Hence, the spatial fundamental component of the first resolver output voltage (provided at the sine terminals 78, 80) includes a representation of the sine of the angular location of the secondary windings 58–61 relative to the primary windings 9, 9' whereas the spatial fundamental component of the second resolver output voltage (provided at the cosine terminals 82, 84) includes a representation of the cosine of the angular location.

It should be understood that when a misalignment causes the secondary and primary planes to be non-parallel (called a plane misalignment), the windings 58–61 provide respective unwanted secondary voltages which are a function of the plane misalignment.

Since the windings 58, 60, for example, are angularlly displaced by 180 degrees, the plane misalignment causes respectively complementary displacements of the windings 58, 60 from the primary plane. That is to say, for a given angular location where the winding 58 is closer to the primary plane than the winding 60, substantially the reverse is true at an angular location of 180° from the given angular location. Because of the complementary displacements and because the windings 58, 60 and the windings 59, 61 are connected in series, there is a cancellation of the plane unwanted voltages due to the misalignment.

In a similar manner, unwanted secondary voltages are caused by an axial misalignment between the windings 58–61 and the primary winding 9, 9'. Because the axial misalignment causes complementary displacements between the primary windings 9, 9' and the secondary windings 58, 61, there is a cancellation of the unwanted voltages due to the axial misalignment.

The cancellation of the unwanted secondary voltages comprises a portion of the disclosure of the U.S. Pat. No. 2,900,612 patent referred to hereinbefore.

It should be understood that in alternative embodiments, a pair of voltages of the same amplitude but having a phase difference of 90° therebetween are respectively applied to the sine terminals 78, 80 and the cosine terminals 82, 84. In response thereto, the primary windings 9, 9' provide a primary voltage having a fundamental component where the phase thereof is representative of the angular location of the secondary windings 58–61 relative to the primary windings 9, 9'.

Figure 4:
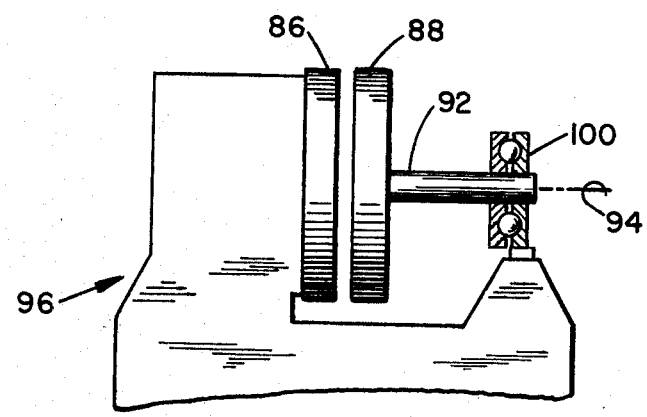
FIG. 4 is a side elevation of a rotary variable coupling transformer.

Referring now to FIG. 4, in a rotary variable coupling transformer constructed in accordance with the invention, the secondary and primary planes are both made from an insulating material. The planes are respectively mounted on a rotor disc 86 and a stator disc 88 which may be made of any suitable material. The disc 88 has a hole axially through the center thereof which receives a shaft 92. The shaft 92 and the disc 86 are maintained coaxial with a central axis 94 by a support structure 96. The disc 86 is fixedly connected to the structure 96 whereby the disc 86 is maintained against rotation. Included in the structure 96 is a bearing 100 wherein the shaft 92 is journalled for rotation.

It should be understood that when the spirals 11, 12, 28, 29 are defined at very large radial displacements from the axis 10, portions thereof may be regarded as being straight parallel segments. As explained hereinafter, the segments are included in primary windings of a linear transformer for providing a voltage which varies as a function of the relative positions of the primary and secondary windings. The primary windings of the linear transformer are equivalent to the primary windings 9, 9'.

Figure 5:
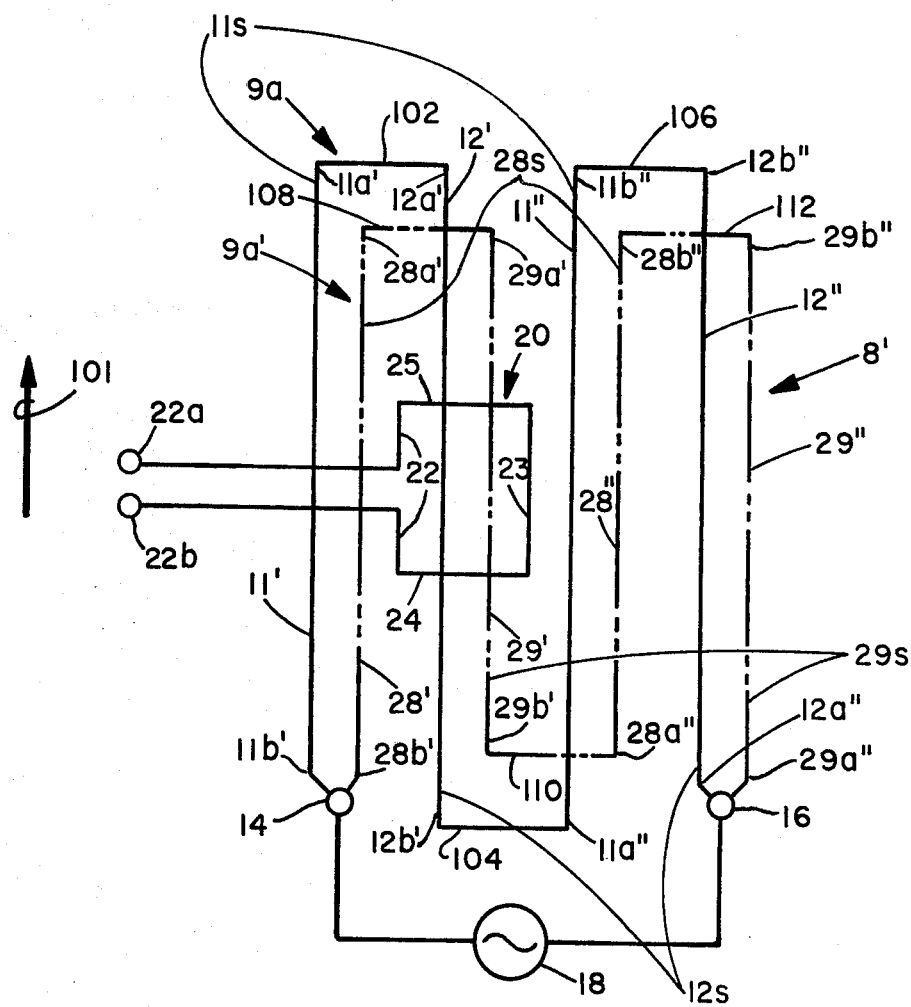
FIG. 5 is a plan view of the winding of a linear variable coupling transformer.

Referring now to FIG. 5, the windings of a linear variable coupling transformer 8' include a first primary winding 9a and a secondary primary winding 9a' which are similar to each other. The first primary winding 9a is comprised of straight conductor segments 11', 11", (collectively referred to as the segments 11s) which are disposed parallel to each other within the primary plane. The segments 11s have a displacement therebetween equal to the pitch of the spirals 11, 12, 28, 29 (FIG. 1), and may thereby regarded as being disposed along adjacent portions of the spiral 11.

The first primary winding 9a further includes straight conductor segments 12', 12" (collectively referred to as the segments 12s), having a displacement therebetween equal to the pitch. The segments 12s are disposed within the primary plane parallel to the segments 11s. The segment 12' is midway between the segments 11s and the segment 12" is displaced from the segment 11" by one-half of the pitch whereby the segments 12s are respectively on opposite sides of the segment 11"'. Accordingly, the segments 12s may be regarded as being disposed along the spiral 12.

In providing the equivalent of the first primary winding 9 (of the transformer 8 of FIG. 1), an essential feature is that a current flowing through the segments 11s in the direction of an arrow 101 equals a current flowing through the segments 12s in the direction opposite from the direction of the arrow 101 and vice versa. It should be understood that the direction of the arrow 101 is in the direction of the extent of the segments 11s, 12s. The provision of the essential feature is analogous to the current flowing clockwise through the spiral 11 being equal to a current flowing counter-clockwise through the spiral 12 and vice versa.

As explained hereinafter, the second primary winding 9a' of the linear coupling transformer is an equivalent to the second primary winding 9' (of the transformer 8).

To provide the first primary winding 9a, ends 12a', 12b' of the segment 12' are respectively connected to an end 11a of the segment 11' through an inactive conductor 102 and to an end 11a'' of the segment 11'' through an inactive conductor 104. Additionally, an end 11b' of the segments 11' and an end 11b'' of the segment 11'' are respectively connected to the terminal 14 and to an end 12b'' of the segment 12'' through an inactive conductor 106. An end 12a'' of the segment 12'' is connected to the terminal 16. Therefore, the first primary winding 9a is a series circuit for providing the essential feature referred to hereinbefore.

In a similar manner, the second primary winding 9a' is disposed within the primary plane.

In providing the second primary winding 9a', straight conductor segments 28', 28'' (collectively referred to as the segments 28s) are disposed parallel to the direction of the arrow 101, the displacement between the segments 28s being equal to the pitch.

The segment 28' is disposed with displacements from the segments 11', 11'' respectively equal to one-sixth and five-sixths of the pitch; similarly, the conductor 28'' is disposed with a displacement from the conductor 11'' equal to one-sixth of the pitch. Accordingly, segments 28s may be regarded as being disposed along adjacent portions of the spiral 28.

The second primary winding 9a' further includes straight conductor segments 29', 29'' (collectively referred to as the segments 29s) having a displacement therebetween equal to the pitch and disposed parallel to the direction of the arrow 101. The segment 29' is midway between the segments 28s and the segment 29'' is displaced from the segment 28'' by one-half of the pitch whereby the segments 29s are respectively on opposite sides of the segment 28''. Accordingly, the segments 29s may be regarded as being disposed along the spiral 29.

To provide the second primary winding 9a', ends 29a', 29b' of the segment 29' are respectively connected to an end 28a' of the segment 28' through an inactive conductor 108 and to an end 28a'' of the segment 28'' through an inactive conductor 110. Additionally, an end 28b' of the segment 28', and an end 28b'' of the segment 28'' are respectively connected to the terminal 14 and to an end 29b'' of the segment 29'' through an inactive conductor 112. An end 29a'' of the segment 29'' is connected to the terminal 16. Accordingly, the primary windings 9a, 9a' are connected in parallel.

The operation of the linear transformer 8' is analogous to the operation of the transformer 8 described hereinbefore. In the transformer 8 during a 360° rotation of the winding 20, for example, respective proximities of the conductors 22, 23 to the spirals 11, 12, 28, 29 vary as in a function of the angular location of the winding 20 relative to the primary windings 9, 9'. Analogously, in the linear transformer 8' during the movement of the winding 20 in a direction perpendicular to the direction of the arrow 101, respective proximities of the conductors 22, 23 to the segments 11, 12, 28, 29 are varied as a function of the position of the winding 20 relative to the primary windings 9a, 9a'.

The operation of the linear transformer 8' is considered hereinafter when the winding 20 has respective dispositions analogous to the symmetric dispositions thereof about the radii 30, 32, 34, 36 which is described hereinbefore in connection with the transformer 8 (FIG. 1).

When the conductors 22, 23 are respectively equidistant from the segments 11s and the segment 12', the winding 20 provides a secondary voltage which is substantially zero for reasons analogous to those given in connection with the winding 20 being symmetrical about the radius 30.

Similarly, when the conductors 22, 23 are respectively equidistant from the segments 29s and the segment 11'', the winding 20 provides a secondary voltage which is substantially zero for the reasons given in connection with the winding 20 being symmetrically disposed about the radius 34.

An equivalent to the disposition about the radius 32 is provided when conductors 22, 23 are respectively in close proximity to the segments 12', 28'' whereby a maximum secondary voltage is provided by the winding 20.

Similarly, an equivalent to the disposition of the winding about the radius 36 is provided when the conductors 22, 23 are respectively in close proximity to the segments 11', 12' whereby a maximum secondary voltage is provided by the winding 20.

Because the linear transformer 8' is analogous to the transformer 8, FIG. 2 provides representations of first and second voltages respectively induced into the winding 20 as a function of the position thereof relative to the primary windings 9a, 9a'.

In the linear transformer 8', the order of a cancelled spatial harmonic component and the displacement between adjacent segments of the primary windings 9a, 9a' is in accordance with a relationship which is given as:

$$D = K \frac{P}{2n}$$

where
P is the displacement (or pitch) between alternate adjacent segments of one of the primary windings, 9a, 9a'; and
D is the displacement between a segment of the first primary winding 9a and a segment of the second primary winding 9a'.

Thus there has been shown and described a rotary variable coupling transformer, a resolver and a linear variable coupling transformer, all of which exemplify the present invention.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. A position-measuring transformer, comprising:
 a first winding which defines substantially within a primary plane a pair of concentric spiral conductors of equal and constant pitch with a fixed angular displacement therebetween;

a second winding rotatable with respect to said first winding about the axis of the spiral conductors, said second winding being substantially within a secondary plane parallel to said primary plane and having a pair of arcuate conductors concentric with said first winding, said arcuate conductors having a radial displacement therebetween substantially equal to an integral multiple of one-half of said pitch; and a third winding which is substantially within said primary plane concentric with said first winding and is defined by spiral conductors having said equal and constant pitch and said fixed angular displacement between each other, corresponding conductors of said first and third windings having a known angular displacement therebetween for the cancellation of a spatial harmonic of a spatial fundamental of a signal provided through said second winding in response to a carrier signal being provided to said first and third windings concurrently with said relative rotation where said known angular displacement is in accordance with a relationship which is given as:

$$\theta = K \frac{360}{2n}$$

where $\theta$ is said known angular displacement in degrees;

$K$ is an odd integer; and $n$ is the order of the cancelled spatial harmonic component.

2. Apparatus according to claim 1 wherein said known angular displacement is equal to the angular displacement of one-half cycle of a spatial harmonic component.

3. Apparatus according to claim 1 wherein said known angular displacement is equal to 60°.

4. A position-measuring transformer comprising:

a first primary winding including a plurality of first conductor portions which are arranged substantially within a primary plane parallel to each other with a known and equal displacement between adjacent first conductor portions, said first conductor portions being connected to provide equal currents flowing in opposite directions through said adjacent first conductor portions when said first winding is coupled to a voltage source;

a secondary winding mounted for motion relative to said first winding, a component of said motion being in a direction normal to the direction of the extent of said first conductor portions, said secondary winding being substantially within a secondary plane parallel to said primary plane and having a pair of conductors substantially parallel to said first conductor portions, said conductors having a displacement therebetween substantially equal to the displacement between said adjacent first conductor portions; and a second primary winding including a plurality of second conductor portions which are arranged substantially within said primary plane parallel to said first conductor portions, said second conductor portions being connected to provide equal currents respectively flowing in opposite directions through adjacent second conductor portions when said second primary winding is connected to a voltage source, said first and second primary windings being respectively disposed to cause a cancellation of a spatial harmonic of a spatial fundamental of a signal which is provided by said secondary winding in response to a carrier signal being provided to said first and second primary windings concurrently with said relative motion; wherein each second conductor portion is displaced from a first conductor portion in accordance with a relationship which is given as:

$$D = K \frac{P}{2n}$$

where $P$ is the displacement between alternate adjacent conductor portions of a primary winding;

$D$ is the displacement between said first and said second conductor portions;

$n$ is the order of a cancelled spatial harmonic component; and $K$ is an odd integer.

5. Apparatus according to claim 4 wherein the displacement between said first and second conductor portions is one-third of the displacement between adjacent first conductor portions.

6. Apparatus according to claim 4 wherein the displacement between said first and second conductor portions is equal to one-half cycle of a spatial harmonic component.

7. A transformer comprising relatively movable members, each having a winding, said windings being inductively related, the improvement wherein one of said windings has two sections, each section having conductor portions carrying current in opposite directions, the displacement between the conductor portions of said sections being the same, the conductor portions of each section being in series with each other and extending side by side in spaced parallel relationship to the conductor portions of the other section, and said sections each being electrically connected to an external circuit, the conductor portions of one of said sections being displayed between the conductor portions of the other section an amount equal to one-half cycle of an undesired spatial harmonic of a fundamental component of a voltage induced in one of said windings, during relative movement of said members, for substantially cancelling said spatial harmonic.

8. A transformer according to claim 7 wherein said members are relatively rotatable, each of said sections of said one winding being in the form of a spiral.

9. A transformer according to claim 7 wherein said members are relatively rotatable on an axis, each of said sections of said one winding being in the form of a spiral, said other winding comprising two pairs of winding groups, said pairs being arranged in space quadrature, the winding groups of each pair being oppositely disposed on a diameter having a center at said axis, each group comprising a plurality of active conductors connected in series and located at different radial distances of said axis, the active conductor of each group being concentrically arcuate about said axis and having a pitch one-half the pitch of the spiral conductors of said winding.

10. A position measuring transformer according to claim 4 wherein said conductor portions of said first and second primary windings are substantially straight.

* * * * *